United States Patent
Lin

(10) Patent No.: US 10,309,437 B2
(45) Date of Patent: Jun. 4, 2019

(54) SCREW

(71) Applicant: KWANTEX RESEARCH INC., Tainan (TW)

(72) Inventor: Chao-Wei Lin, Tainan (TW)

(73) Assignee: KWANTEX RESEARCH INC., Tainan (TW)

( * ) Notice: Subject to any disclaimer, the term of this patent is extended or adjusted under 35 U.S.C. 154(b) by 184 days.

(21) Appl. No.: 15/463,654

(22) Filed: Mar. 20, 2017

(65) Prior Publication Data

US 2018/0209465 A1 Jul. 26, 2018

(30) Foreign Application Priority Data

Jan. 25, 2017 (TW) .............................. 106102798 A

(51) Int. Cl.
*F16B 25/00* (2006.01)

(52) U.S. Cl.
CPC .......... *F16B 25/0026* (2013.01); *F16B 25/00* (2013.01); *F16B 25/0052* (2013.01); *F16B 25/0068* (2013.01); *F16B 25/0084* (2013.01)

(58) Field of Classification Search
CPC .............. F16B 25/0026; F16B 25/0036; F16B 25/0042; F16B 25/0052; F16B 25/0057; F16B 25/0068; F16B 25/0084; F16B 25/00
USPC .......................... 411/386, 411, 412, 415, 417
See application file for complete search history.

(56) References Cited

U.S. PATENT DOCUMENTS

| | | | | |
|---|---|---|---|---|
| RE27,678 E | * | 6/1973 | Orlomoski | F16B 39/30 411/311 |
| 5,957,646 A | * | 9/1999 | Giannuzzi | F16B 25/00 411/311 |
| 6,976,818 B2 | * | 12/2005 | Levey | F16B 33/02 411/310 |
| 7,156,600 B2 | * | 1/2007 | Panasik | B21H 3/02 411/308 |
| 8,647,038 B2 | * | 2/2014 | Gong | F16B 25/0031 411/386 |
| 9,581,183 B2 | * | 2/2017 | Lajewardi | F16B 25/0052 |
| 2003/0206787 A1 | * | 11/2003 | Huang | F16B 5/0275 411/412 |
| 2009/0003970 A1 | * | 1/2009 | Griffith | F16B 25/0026 411/485 |
| 2010/0047035 A1 | * | 2/2010 | Rosenkranz | F16B 25/0026 411/387.4 |
| 2011/0014007 A1 | * | 1/2011 | Gaudron | F16B 25/00 411/412 |

(Continued)

*Primary Examiner* — Roberta S Delisle
(74) *Attorney, Agent, or Firm* — Muncy, Geissler, Olds & Lowe, P.C.

(57) ABSTRACT

A screw includes a head and a shank extending from the head to terminate at a frusto-conical tip portion. A first thread section has asymmetric upper and lower thread surfaces, a plurality of V-shaped notches formed at a juncture of the surfaces, and a fillet surface formed at a juncture between the shank and the upper thread surface. Two second thread sections are disposed adjacent to each other and spaced apart from the first thread section. A third thread section extends from the first thread section toward the tip portion and has an outer surface of an arc-shaped cross-section. The screw-in movement of the screw is guided by the third thread section to prevent the screw from being slanted relative to a concrete object.

8 Claims, 7 Drawing Sheets

(56) References Cited

U.S. PATENT DOCUMENTS

2011/0176888 A1* 7/2011 Gaudron ................. F16B 25/00
                                                            411/394
2013/0336744 A1* 12/2013 Phua ................... F16B 25/0026
                                                          411/387.1
2016/0238053 A1* 8/2016 Lajewardi ........... F16B 25/0052

* cited by examiner

SCREW

CROSS-REFERENCE TO RELATED APPLICATION

This application claims priority of Taiwanese Patent Application No. 106102798, filed on Jan. 25, 2017.

FIELD

The disclosure relates to a screw, and more particularly to a concrete screw.

BACKGROUND

Referring to FIG. 1, a conventional concrete screw 1 includes a head 11 and a shank 12 integrally extending from the head 11, a first thread 13 helically extending on the shank 12, and a second thread 14 helically extending on the shank 12 and alternating with the first thread 13. The first thread 13 has an outer diameter larger than that of the second thread 14, and each of the first and second threads 13, 14 tapers off towards an outer circumference thereof. When the screw 1 is tightened to a concrete object, the first and second threads 13, 14 cut and ream the concrete material to be readily screwed-in the concrete object. However, because of the sharp edges of the threads 13, 14, the screw is liable to slant and wobble during a starting screw-in movement of the screw 1 from a pilot end 121 of the shank 12. In a slanted state, the screw 1 is subject to a relatively large and increased frictional force during the screw-in movement, and a relatively large torque is required to overcome the frictional force. Thus, the screw-in operation is effortful and time-consuming, and the screw 1 tightened on the concrete object is slanted.

Referring to FIG. 2, another conventional concrete screw 2 includes a head 21, a shank 22 integrally extending from the head 21, and first, second and third threads 23, 24, 25 which helically extend on the shank 22 and which have different and decreased outer diameters. The first thread 23 includes a plurality of helically extending thread segments 231 intermittent to each other by a plurality of non-thread segments 232. When the screw 2 is tightened to a concrete object, the first, second and third threads 23, 24, 25 with different and decreased outer diameters guide the screw-in movement of the screw 2. The drawback of the screw 2 resides in that the thread segment 231 of the first thread 23 near the pilot end 221 of the shank 22 has a sharp edge and thus renders the screw 2 to slant during a starting screw-in movement. Moreover, a space provided by the non-thread segments 232 is not sufficient to accommodate swarf generated during the screw-in movement. The swarf may interfere with the screw-in movement and may result in an effortful and time-consuming operation.

SUMMARY

Therefore, an object of the disclosure is to provide a screw that can alleviate at least one of the drawbacks of the prior arts.

According to the disclosure, the screw includes a head, a shank extending from the head along a central axis to terminate at a frusto-conical tip portion, and a first thread section, two second thread sections and a third thread section helically disposed on the shank. The first thread section has an upper thread surface which faces the head, a lower thread surface which faces the tip portion and which is asymmetric with the upper thread surface, a plurality of V-shaped notches which are formed at a juncture between the upper and lower thread surfaces and which are spaced apart from each other along a helical line of the juncture, and a fillet surface which is formed at a juncture between the shank and the upper thread surface. The second thread sections are disposed adjacent to each other, and each of the second thread sections is spaced apart from the first thread section. The third thread section extends from the first thread section toward the tip portion, and has an outer surface of an arc-shaped cross-section.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
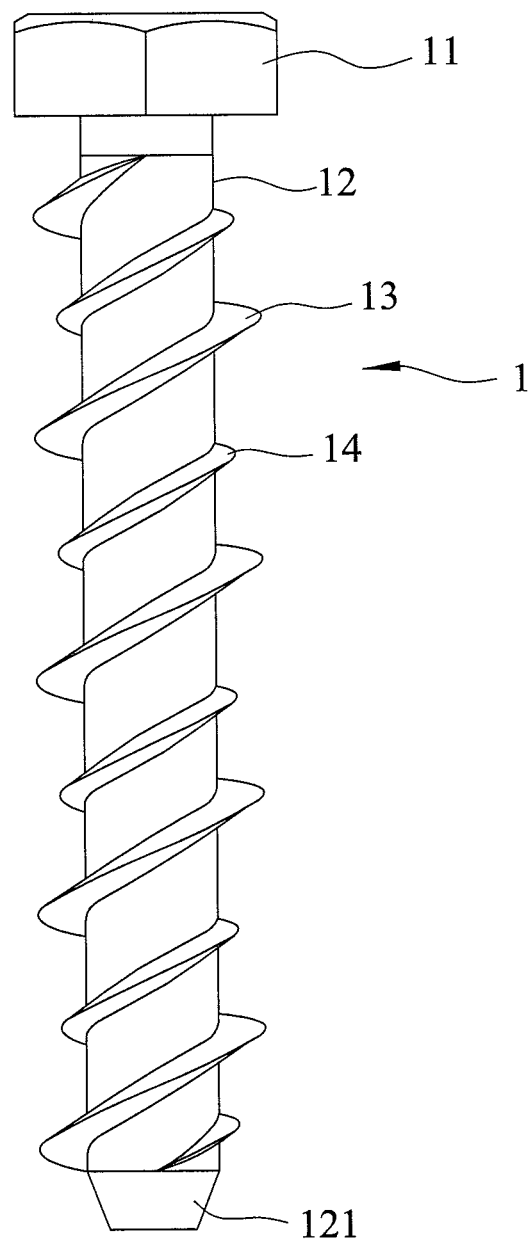
FIG. 1 is a side view of a conventional concrete screw.
Figure 2:
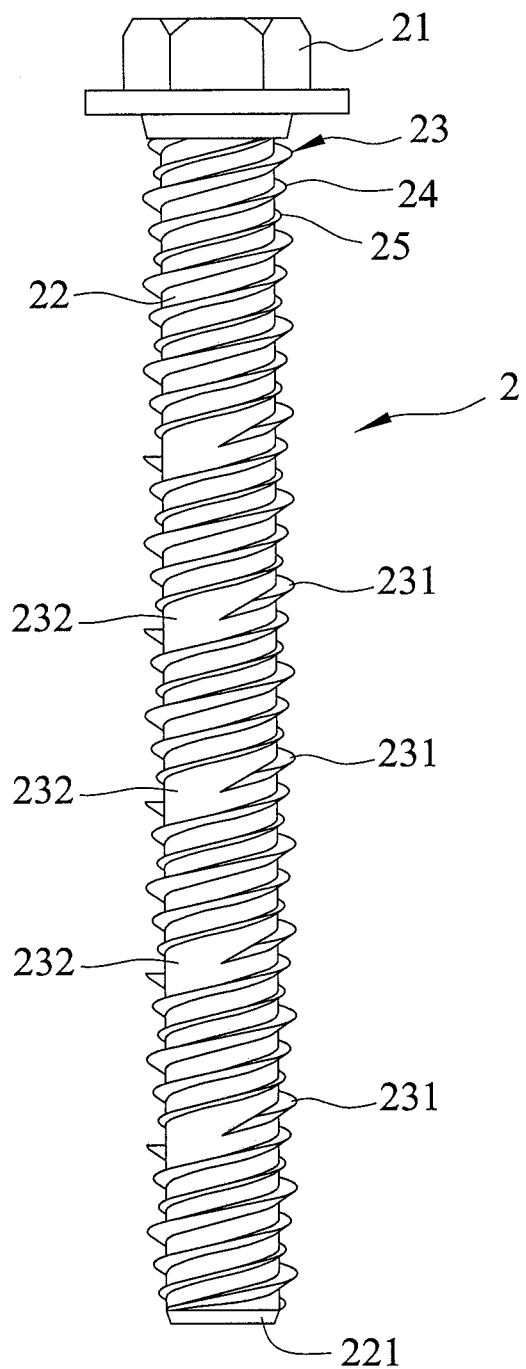
FIG. 2 is a side view of another conventional concrete screw.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
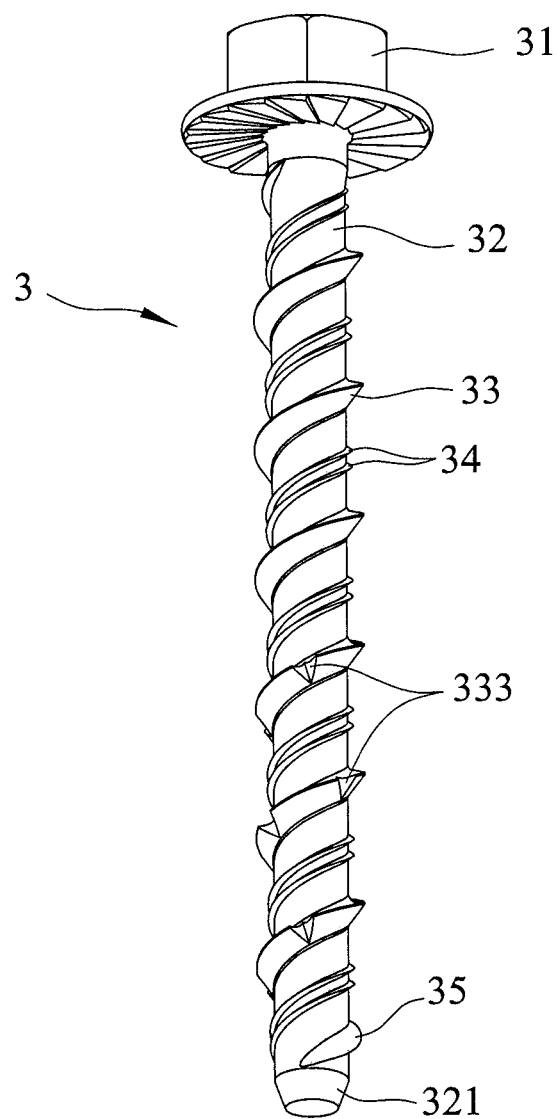
FIG. 3 is a perspective view of an embodiment of a screw according to the disclosure.
Figure 4:
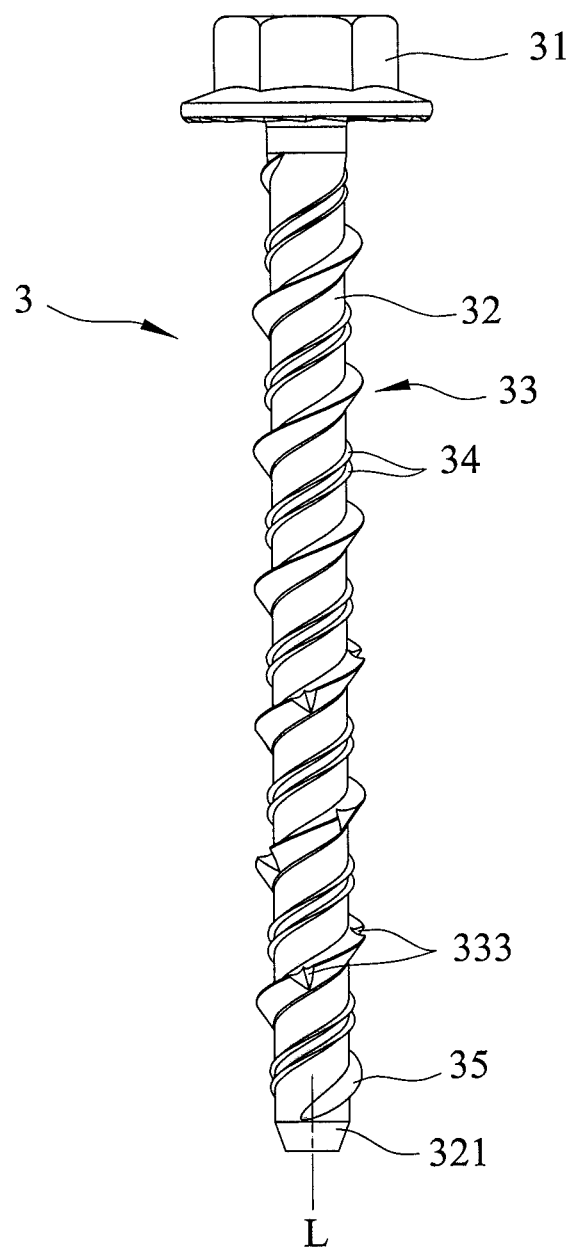
FIG. 4 is a side view of the embodiment.
Figure 5:
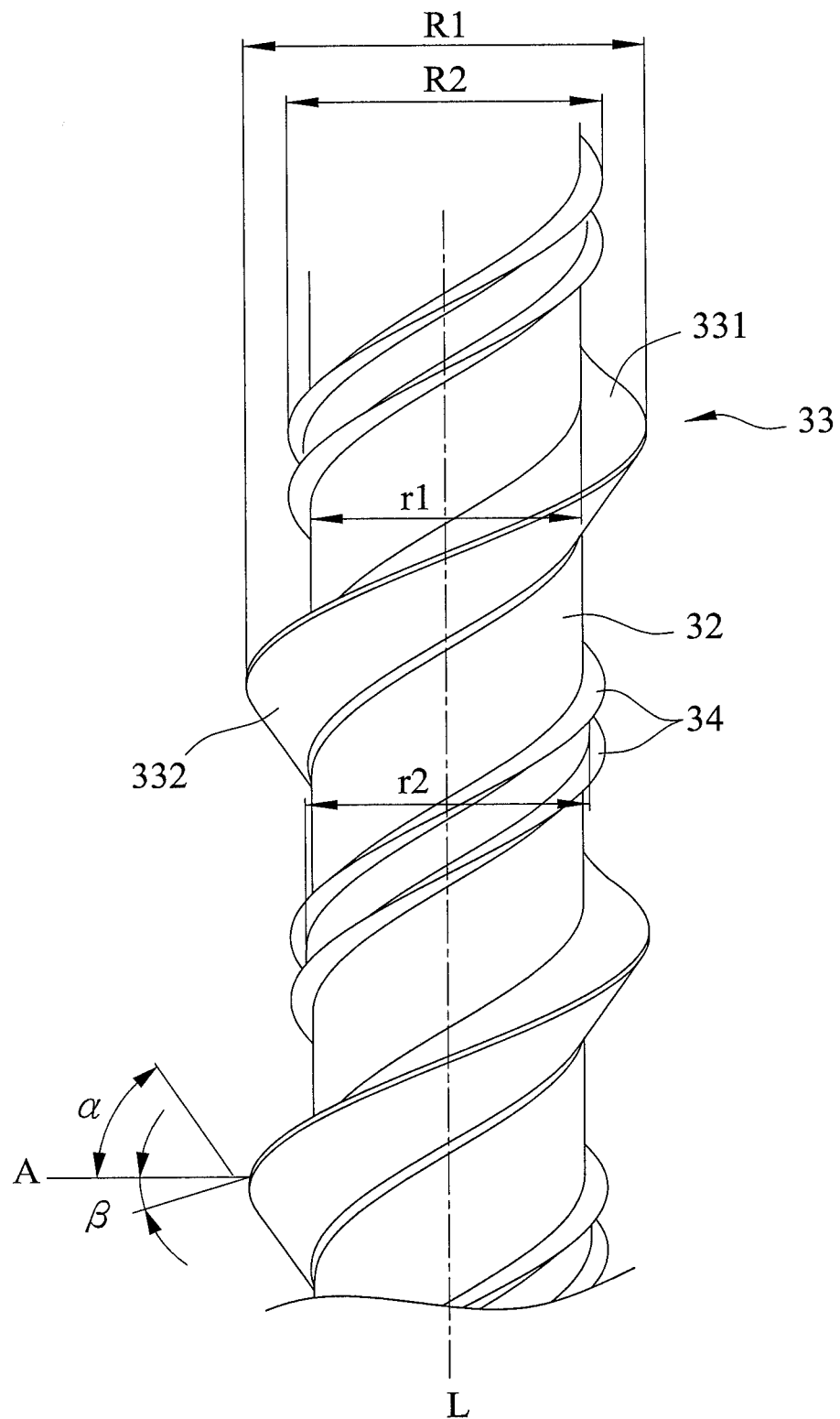
FIG. 5 is a fragmentary, enlarged side view of a portion of the embodiment.

Referring to FIGS. 3 and 4, an embodiment of a screw 3 according to the disclosure includes a head 31, a shank 32 which extends from the head 31 along a central axis (L) to terminate at a frusto-conical tip portion 321, a first thread section 33 which is helically disposed on the shank 32, two second thread sections 34 which are helically disposed on the shank 32 and adjacent to each other, and each of which is spaced apart from the first thread section 33, and a third thread section 35 which is helically disposed on the shank 32. The third thread section 35 has an outer surface of an arc-shaped cross-section. The third thread section 35 helically extends from the first thread section 33 toward the tip portion 321, and along a half turn of the shank 32. The third thread section 35 has an outer diameter which is gradually reduced from the first thread section 33 toward the tip portion 321. As shown in FIG. 5, each of the second thread sections 34 has a maximum thread diameter (R2) which is smaller than a maximum thread diameter (R1) of the first thread section 33. Each of the second thread sections 34 has a root diameter (r2) which is larger than a root diameter (r1) of the first thread section 33. The third thread section 35, which has the arc-shaped outer surface and the gradually increased outer diameter from the tip portion 321, can guide the screw-in movement of the screw 3 of this embodiment in a universal manner so as to avoid the screw 3 from being slanted relative to a concrete object. In this way, a reduced frictional force is exerted on the screw 3 and a relatively small torque is required during the screw-in movement.

Figure 6:
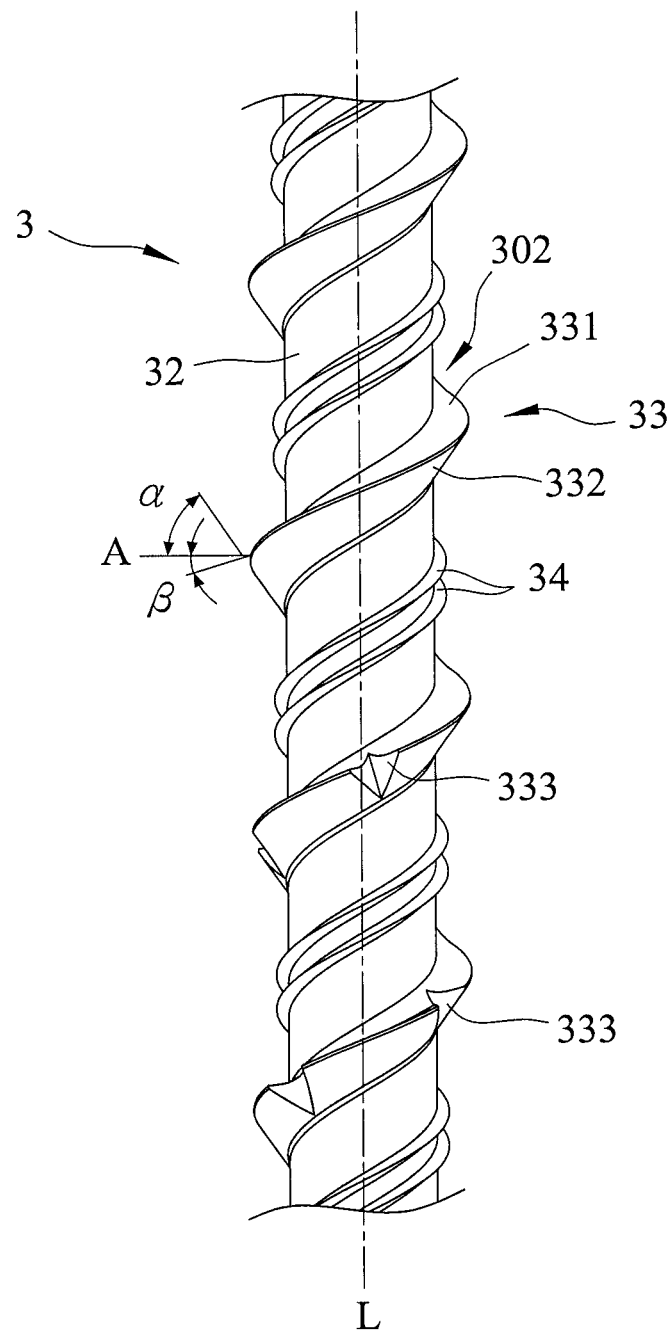
FIG. 6 is a fragmentary, enlarged side view of a portion of the embodiment.

Referring to FIG. 6, the first thread section 33 has an upper thread surface 331 which faces the head 31, a lower thread surface 332 which faces the tip portion 321, and a plurality of V-shaped notches 333 which are formed at a juncture between the upper and lower thread surfaces 331, 332 and which are spaced apart from each other along a helical line of the juncture. The V-shaped notches 333 are distributed on the first thread section 33 around at least one turn of the first thread section 33 such that an even cutting force is generated during the screw-in movement to evenly cut the concrete material. Additionally, the V-shaped notches 333 can accommodate swarf generated during the screw-in movement so as to facilitate the screw-in movement. The second thread sections 34 can further guide the screw-in movement of the screw 3 to render the screw-in movement more steady and to prevent the screw 3 from being slanted to the concrete object.

At a juncture between the shank 32 and the upper thread surface 331, a fillet surface 302 is formed to reduce a stress concentration therebetween so as to prevent breakage during the screw-in movement. The lower thread surface 332 is asymmetric with the upper thread surface 331. The shank 32 defines a reference plane (A) to which the central axis (L) is normal and which passes through the shank 32. The lower thread surface 332 intersects the reference plane (A) by an included angle ($\alpha$). The upper thread surface 331 intersects the reference plane (A) by an included angle ($\beta$) which is smaller than the included angle ($\alpha$). With such asymmetric design of the upper and lower thread surfaces 331, 332, the tightening force of the first thread section 33 to the concrete object is increased to stabilize firmly the screw 3 to the concrete object so as to enhance the bearing force and tensile strength. Thus, the screw 3 is more durable and is capable of bearing a larger load.

Figure 7:
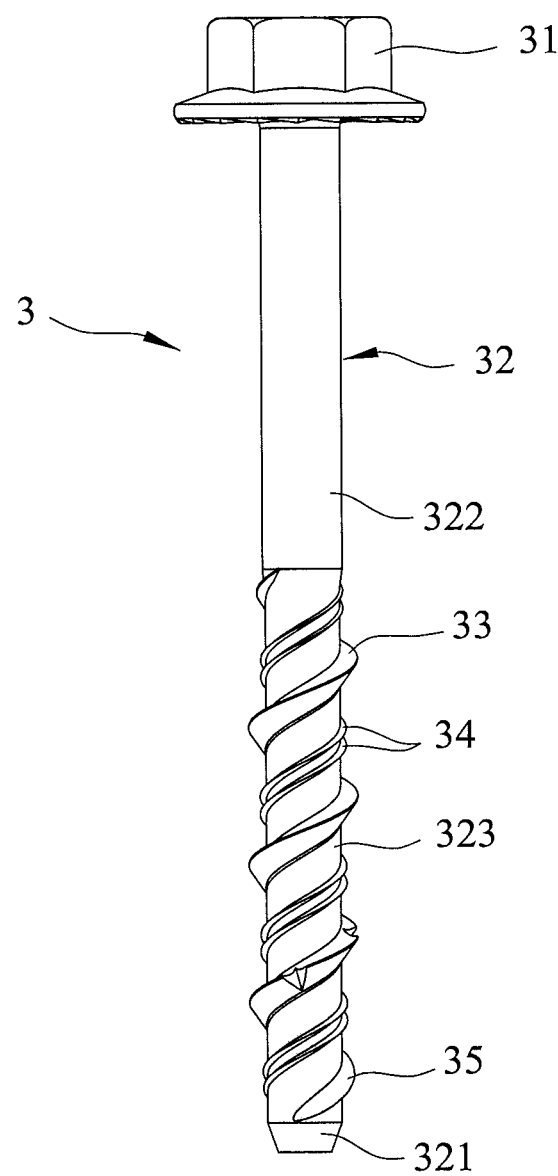
FIG. 7 is a side view of another embodiment of a screw according to the disclosure.

Referring to FIG. 7, in another embodiment of the screw 3, the shank 32 has a non-threaded shank section 322 adjoining the head 31, and a threaded shank section 323 on which the first, second and third thread sections 33, 34, 35 are disposed. The non-threaded shank section 322 is not driven into the concrete object and can be disposed for tightening of another object thereto as required.

In summary, the third thread section 35 can guide the screw-in movement of the screw 3 in a universal manner, and the second thread sections 34 can further guide the screw-in movement to render the screw-in movement more steady and to prevent the screw 3 from being slanted relative to a concrete object. Moreover, with the V-shaped notches 333, an even cutting force is generated to evenly cut the concrete material of the concrete object during the screw-in movement, and swarf can be accommodated therein to facilitate the screw-in movement. With the asymmetric design of the upper and lower thread surfaces 331, 332, the tightening force of the first thread section 33 to the concrete object is increased to stabilize firmly the screw 3 to the concrete object so as to enhance the bearing force and tensile strength. Thus, the screw 3 is more durable and is capable of bearing a larger load.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A screw comprising:
    a head;
    a shank extending from said head along a central axis to terminate at a frusto-conical tip portion;
    a first thread section helically disposed on said shank, and having an upper thread surface which faces said head, a lower thread surface which faces said tip portion and which is asymmetric with said upper thread surface, a plurality of V-shaped notches which are formed at a juncture between said upper and lower thread surfaces and which are spaced apart from each other along a helical line of the juncture, and a fillet surface which is formed at a juncture between said shank and said upper thread surface;
    two second thread sections helically disposed on said shank and adjacent to each other, and each spaced apart from said first thread section; and
    a third thread section helically disposed on said shank and extending from said first thread section toward said tip portion, said third thread section having an outer surface of an arc-shaped cross-section.

2. The screw as claimed in claim 1, wherein each of said second thread sections has a maximum thread diameter which is smaller than a maximum thread diameter of said first thread section.

3. The screw as claimed in claim 1, wherein each of said second thread sections has a root diameter which is larger than a root diameter of said first thread section.

4. The screw as claimed in claim 1, wherein said shank has a non-threaded shank section adjoining said head, and a threaded shank section on which said first, second and third thread sections are disposed.

5. The screw as claimed in claim 1, wherein said shank defines a reference plane to which the central axis is normal and which passes through said shank, said lower thread surface intersecting the reference plane by an included angle, said upper thread surface intersecting the reference plane by an included angle which is smaller than the included angle.

6. The screw as claimed in claim 1, wherein said V-shaped notches are distributed on said first thread section around at least one turn of said first thread section.

7. The screw as claimed in claim 1, wherein said third thread section helically extends along a half turn of said shank.

8. The screw as claimed in claim 1, wherein said third thread section has an outer diameter which is decreased gradually from said first thread section toward said tip portion.

* * * * *